(No Model.)

R. CARLIN.
ROD PACKING.

No. 478,919. Patented July 12, 1892.

Witnesses:
Harry S. Rohrer.
Geo. E. Cruse.

Inventor:
Ross Carlin
By Knight Bros.
Attorneys

THE NORRIS PETERS CO., PHOTO-LITHO., WASHINGTON, D. C.

UNITED STATES PATENT OFFICE.

ROSS CARLIN, OF NEW ORLEANS, LOUISIANA.

ROD-PACKING.

SPECIFICATION forming part of Letters Patent No. 478,919, dated July 12, 1892.

Application filed January 26, 1892. Serial No. 419,326. (No specimens.)

*To all whom it may concern:*

Be it known that I, ROSS CARLIN, a citizen of the United States, residing at New Orleans, in the parish of Orleans and State of Louisiana, have invented certain new and useful Improvements in Packing for Stuffing-Boxes, of which the following is a specification.

My invention relates to a fibrous packing for use in connection with stuffing-boxes of pumps, engines, &c., the object being to provide a packing which will make a tighter union with the rod working through the box by accommodating itself better to the surface and by admitting steam and swelling, as will hereinafter appear.

My invention consists in forming the packing of a number of blocks or segments of a woven, plaited, or twisted or otherwise manufactured article formed of suitable fiber and arranged to form a rim around the piston-rod with the cut or loose ends presented to the piston. This improved form of packing is preferably, though not necessarily, used in layers with intervening rings of a suitable plaited packing-strip or other suitable means for preventing the segmental rings from losing their alignment.

The invention will be understood upon reference to the accompanying drawings, in which—

Figure 1:
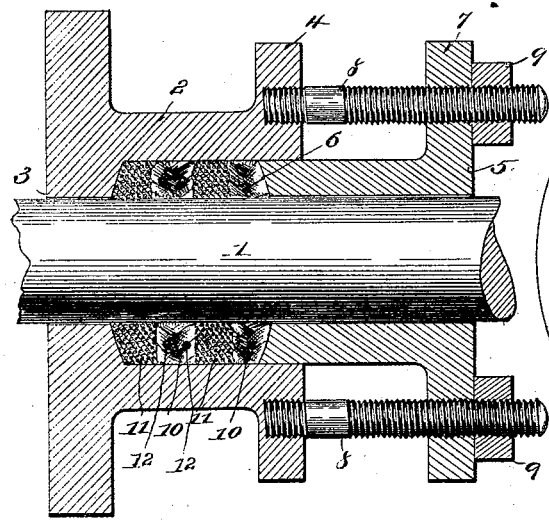
Figure 2:
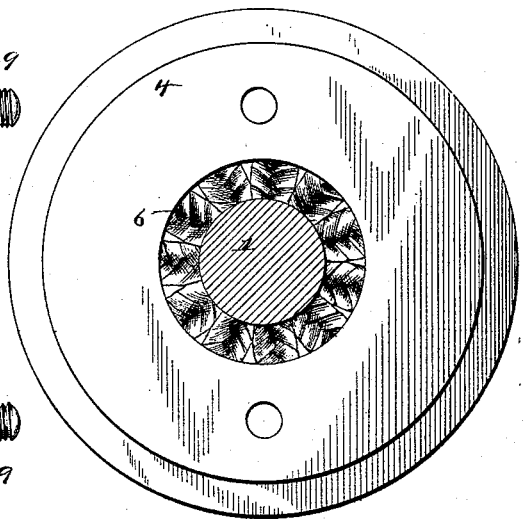
Figure 3:
Figure 4:
Figure 5:

Figure 1 is an axial section of a stuffing-box in which is shown a piston-rod and my improved packing. Fig. 2 is an end view of the same with the follower removed. Fig. 3 represents the form of packing-ring in common use. Fig. 4 represents a portion of a packing-ring made in accordance with my invention. Fig. 5 represents one of the segments of which the packing is composed.

1 represents the piston-rod; 2, the stuffing-box, which has the opening 3 and flange 4, and 5 represents the follower having the concave end 6 and the flange 7.

8 represents the screw, and 9 the nut thereon, which is inserted at two or more points for drawing the flanges 4 and 7 together when it is desired to compress the packing in the box. The packing is made up of the rings 10 and 11, the former of which are formed of segments 10$^a$ and the latter of which are formed of the usual plaited strip, which is interposed between the other rings for the purpose of maintaining the alignment.

With a packing constructed as above described a closer union is made with the surfaces past which the steam tends to leak and the steam may enter between the fibers of the segmental rings and swell the packing, thus making a better joint and one which compensates largely for wear and requires very little attention or change. In applying the segments around the piston the inner ends adjacent to the piston-rod are held closely and firmly together and form a tight ring around the piston-rod, while the outer ends are slightly spaced apart and leave sufficient expansion to render the packing elastic. If desired, the thread or threads 12 may be run through the segments in order to make it more convenient in applying the packing; but this is not necessary.

I find in practice that packing made in accordance with my present invention will outlast that used in the old way, and my improved packing will not score or heat the rod, inasmuch as the ends are next to the rod and the packing is elastic as a whole. I also find that in the use of my improved packing the hole in the gland and cylinder-head may be from one-fourth to one-half inch larger than the rod without necessitating the use of the inside ring. The practical advantage of this will be recognized. If the hole in the gland and cylinder-head and the ring all fit close and the cross-head begins to wear, as it must do, the rod falls, is worn, and is no longer round. It will then be a difficult thing to prevent the leaking of steam around the rod. It is also found in my form of packing that the follower does not have to be screwed up very tight, so that much friction and loss of power are avoided. My improved form of packing, moreover, is especially adapted for packing-rings of large diameter, it being only necessary to add segments in order to build up the ring to any size. It is unnecessary to remove the follower from the rod or to detach the pison-rod when inserting my packing. With the enlarged opening in the gland and cylinder the necessity for reboring or for inserting bushing will be avoided.

Having thus described my invention, the following is what I claim as new therein and desire to secure by Letters Patent:

1. A packing for substantially the purpose specified, formed of segments of fibrous fabric or material arranged with the cut ends for contact with the surface to be packed, as explained.

2. The packing for substantially the purpose specified, formed of segments of woven or analogous fibrous material arranged with the cut ends in contact with the surface to be packed and having interspaced continuous rings, substantially as and for the purpose specified.

ROSS CARLIN.

Witnesses:
CHARLES H. COOPER,
JOSEPH RAMSEY.